US008634394B1

(12) United States Patent
Zhao et al.

(10) Patent No.: US 8,634,394 B1
(45) Date of Patent: *Jan. 21, 2014

(54) MECHANISM TO VERIFY PACKET DATA NETWORK SUPPORT FOR INTERNET PROTOCOL MOBILITY

(75) Inventors: Fan Zhao, Campbell, CA (US); Stefano Faccin, Hayward, CA (US); Ameya Damle, Santa Clara, CA (US)

(73) Assignee: Marvell International Ltd, Hamilton (BM)

( * ) Notice: Subject to any disclaimer, the term of this patent is extended or adjusted under 35 U.S.C. 154(b) by 116 days.

This patent is subject to a terminal disclaimer.

(21) Appl. No.: 13/280,223

(22) Filed: Oct. 24, 2011

Related U.S. Application Data

(63) Continuation of application No. 12/211,282, filed on Sep. 16, 2008, now Pat. No. 8,045,569.

(60) Provisional application No. 60/973,260, filed on Sep. 18, 2007.

(51) Int. Cl.
*H04L 12/28* (2006.01)
*H04J 1/16* (2006.01)

(52) U.S. Cl.
USPC ........... 370/338; 370/252; 370/401; 370/392; 370/352

(58) Field of Classification Search
USPC .............................. 370/252, 401, 392, 338, 352
See application file for complete search history.

(56) References Cited

U.S. PATENT DOCUMENTS

| 7,822,861 | B2 * | 10/2010 | Annic .......................... 709/228 |
| 2002/0067704 | A1 | 6/2002 | Ton |
| 2009/0016270 | A1 | 1/2009 | Tsirtsis (Georgios) et al. |
| 2009/0047947 | A1 | 2/2009 | Giaretta et al. |
| 2010/0023763 | A1 | 1/2010 | Chandranmenon et al. |
| 2012/0226793 | A1* | 9/2012 | Rover et al. ................... 709/223 |

OTHER PUBLICATIONS

RFC 3344; IP Mobility Support for IPv4; C. Perkins, Ed., Nokia Research Center; www.rfceditor.orq/rfc/rfc3344.txt; Aug. 2002; 99 paqes.
RFC 3775; Mobility Support in IPv6; D. Johnson, Rice University, C.Perkins, Nokia Research Center, J. Arkko, Erricsson; Jun. 2004; 165 pages.
Proxy Mobile IPv5; draft-ietf-netlmm-proxymip6-01.txt; Gundavelli, Leung, Cisco,Devarapalli, Azaire Networks, Chowdhury, Starent Networks, Patil, Nokia Siemens Jun. 18, 2007,49pgs.
RFC 2131; Dynamic Host Configuration Protocol; R. Droms, Bucknell University; Mar. 1997; 45 pages.
RFC 3315; Dynamic Host Configuration Protocol for IPv6 (DHCPv6); Droms, Ed., Cisco, Bound, HP, Volz, Ericsson, Lemon, Nominum, Perkins, Nokia research, Carney,Sun, Jul. 2003,101pg.
RFC 2461; Neighbor Discovery for IP Version 6 (IPv6); 1. Narten, IBM, E. Nordmark, Sun Microsystems, W. Simpson, Daydreamer; Dec. 1998; 93 pages.
RFC 2462; IPv6 Stateless Address Autoconfiguration; S. Thomson, Bellcore, 1. Narten, IBM; Dec. 1998; 25 pages.
RFC 4306; Internet Key Exchange (IKEv2) Protocol; C. Kaufman, Ed., Microsoft; Dec. 2008; 99 pages.

* cited by examiner

Primary Examiner — John Pezzlo

(57) ABSTRACT

An access router includes a wireless network interface, an address assignment module, and an availability module. The wireless network interface establishes a wireless link with a wireless terminal. The address assignment module determines a list of packet data networks for use by the wireless terminal. The availability module determines a mobile internet protocol availability for each packet data network in the list of packet data networks and generates an availability signal based on each mobile internet protocol availability. The address assignment module transmits an address assignment message that includes the availability signal to the wireless terminal.

18 Claims, 11 Drawing Sheets

| APN | Service Identifiers |
|---|---|
| $APN_1$ | 8 (Push Email), 9 (Text Messaging) |
| $APN_2$ | 3 (VoIP) |
| $APN_3$ | 7 (Web Browsing) |

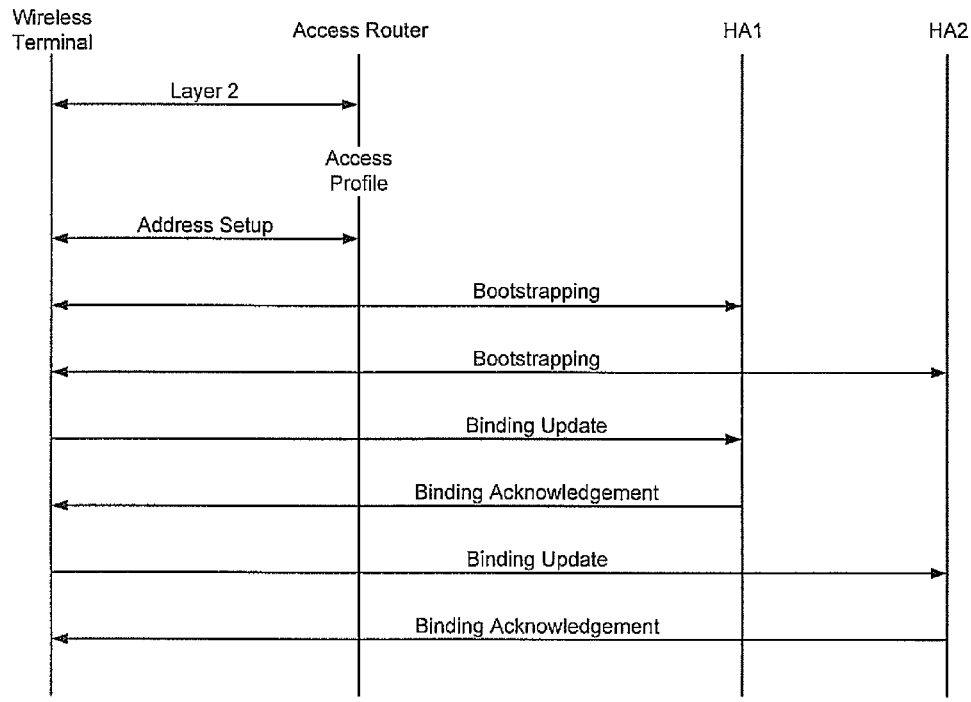
FIG. 11
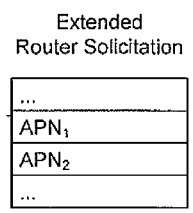 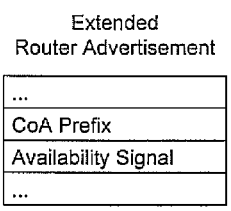 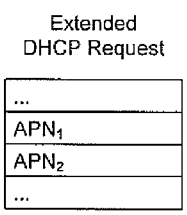 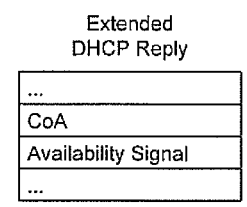
FIG. 12A  FIG. 12B  FIG. 12C  FIG. 12D

MECHANISM TO VERIFY PACKET DATA NETWORK SUPPORT FOR INTERNET PROTOCOL MOBILITY

CROSS-REFERENCE TO RELATED APPLICATIONS

This present disclosure is a continuation of U.S. application Ser. No. 12/211,282, filed on Sep. 16, 2008, which claims priority under 35 U.S.C. §119(e) to U.S. Provisional Application No. 60/973,260, filed on Sep. 18, 2007.

FIELD

The present disclosure relates to internet protocol mobility and more particularly to verifying packet data network support within an internet protocol mobility framework.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a functional block diagram of a wireless communications system is presented. A home network 102 receives packets from and sends packets to a distributed communications system 104, such as the Internet. A wireless terminal 106 wirelessly connects to the home network 102. For example only, the wireless terminal 106 may be a mobile phone, and the home network 102 may be the cellular network of a mobile phone operator.

The wireless terminal 106 is configured to work with the home network 102, and may be unable to connect to the networks of other carriers. In various implementations, the wireless terminal 106 may be able to view content from the distributed communications system 104 via the home network 102. The home network 102 may interconnect with the networks of other service providers and/or core networks.

Referring now to FIG. 2, a functional block diagram of a wireless communications system offering mobility is presented. The home network 102 is connected to one or more visited networks 110. For example only, FIG. 2 depicts three visited networks 110-1, 110-2, and 110-3. In various implementations, the visited networks 110 may be the networks of other service providers, including service providers in other countries.

A mobile wireless terminal 120 includes mobility features that allow the mobile wireless terminal 120 to communicate with the visited networks 110. For example, in FIG. 2, the mobile wireless terminal 120 has established a wireless connection to the visited network 110-1. The mobile wireless terminal 120 includes the code and data used to communicate with the home network 102 via the visited network 110-1. In this way, the mobile wireless terminal 120 can interface with the home network 102 even when connected to one of the visited networks 110. Because the mobile wireless terminal 120 itself includes mobility features, the mobile wireless terminal 120 may be described as supporting client mobile internet protocol (CMIP).

For example, mobile internet protocol (IP) for IP version 6 (IPv6) is described in request for comment (RFC) 3775, titled "Mobility Support in IPv6," the disclosure of which is hereby incorporated by reference in its entirety. Mobile IP for IP version 4 (IPv4) is described in RFC 3344, entitled "IP Mobility Support for IPv4," the disclosure of which is hereby incorporated by reference in its entirety.

Referring now to FIG. 3, a functional block diagram depicts a wireless communications system that provides proxy mobility to the wireless terminal 106. A home network 150 communicates with visited networks 160-1, 160-2, and 160-3. The visited networks 160 provide transparent mobility to wireless terminals, such as the wireless terminal 106, which do not include mobility functionality. This may be referred to as proxy mobile IP (PMIP) or network mobile IP. Proxy mobility in IPv6 is described in an Internet Engineering Task Force (IETF) draft titled "Proxy Mobile IPv6" (published Jun. 18, 2007 and available as "draft-ietf-netlmm-proxymip6-01.txt"), the disclosure of which is hereby incorporated by reference in its entirety.

When the wireless terminal 106 attempts to establish a link with the visited network 160-1, the visited network 160-1 determines a network (e.g., a home network) to which the wireless terminal 106 belongs. In this case, the visited network 160-1 determines that the home network 150 is the appropriate network. The visited network 160-1 then forwards packets from the wireless terminal 106 to the home network 150 and passes packets from the home network 150 to the wireless terminal 106. The wireless terminal 106 can therefore be oblivious to the fact that the wireless terminal 106 is connected to the visited network 160-1 instead of to the home network 150.

Referring now to FIG. 4, a functional block diagram and timeline of an implementation of client mobility is presented. The home network 102 includes a home agent (HA) 180. The HA 180 establishes a logical location of the mobile wireless terminal 120. Packets ultimately destined for the mobile wireless terminal 120 are sent to the HA 180, while packets from the mobile wireless terminal 120 will appear to originate from the logical location established by the HA 180.

The mobile wireless terminal 120 may establish a connection to an access router (AR) 182 within the visited network 110-1. In various implementations, additional access routers (not shown) may be present. The AR 182 may communicate with other networks, including the home network 102. The mobile wireless terminal 120 establishes layer 1 and layer 2 connectivity with the visited network 110-1.

Once the mobile wireless terminal 120 connects to the visited network 110-1, the mobile wireless terminal 120 may perform authentication and authorization with the AR 182. This may include communicating with an authentication, authorization, and accounting (AAA) server. The AAA server may retrieve information based on an identifier of the mobile wireless terminal 120, such as a network address identifier, that uniquely identifies the mobile wireless terminal 120. The AAA server may indicate to the AR 182 whether the mobile wireless terminal 120 should be allowed access to the home network 102 and what services should be provided to the mobile wireless terminal 120.

The mobile wireless terminal 120 performs address setup to determine a local address from the AR 182. Using this local address, the mobile wireless terminal 120 can communicate with various network elements, including the HA 180. The mobile wireless terminal 120 performs bootstrapping with the HA 180 to determine information such as IP Security Association information. The mobile wireless terminal 120 transmits a binding update message to the HA 180. The HA 180 allocates a global home address HoA to the mobile wireless terminal 120.

The HA 180 may create a binding cache entry that records information about the mobile wireless terminal 120, such as the current address of the mobile wireless terminal 120 and the allocated global home address HoA. In various implementations, the home address may be provided to the mobile wireless terminal 120 during bootstrapping, and the binding update simply registers the assigned home address with the home agent 180.

The HA 180 transmits a binding acknowledgement message to the mobile wireless terminal 120. The binding acknowledgement message includes the HoA so that the mobile wireless terminal 120 is aware of its global home address. Packets sent from other network devices, such as other wireless terminals, are sent to that global home address. The HA 180 receives those packets and forwards them to the mobile wireless terminal 120. Similarly, packets from the mobile wireless terminal 120 are first sent to the HA 180. The HA 180 then forwards the packets with a source address of HoA. To allow for packets to be exchanged between the mobile wireless terminal 120 and the HA 180, a tunnel is established between the mobile wireless terminal 120 and the HA 180.

Referring now to FIG. 5, a functional block diagram and timeline of an implementation of proxy mobility is presented. The wireless terminal 106 may establish a connection to a mobile access gateway (MAG) 190 in the visited network 160-1. In various implementations, additional mobile access gateways (not shown) may be present in the visited network 160-1. The MAG 190 may communicate with other networks, including the home network 150.

Once the wireless terminal 106 connects at layers 1 and 2, the MAG 190 may authenticate the wireless terminal 106 and determine what services the wireless terminal 106 is authorized to access. The wireless terminal 106 then requests an address from the MAG 190. The MAG 190 determines a local mobility anchor (LMA) to which the wireless terminal 106 belongs. For example only, the MAG 190 may consult a home subscriber server (HSS) to determine the appropriate LMA.

The MAG 190 then sends a proxy binding update identifying the wireless terminal 106 to the identified LMA, which in this case is LMA 192, located in the home network 150. The LMA 192 allocates a home address HoA for the wireless terminal 106. The LMA 192 may also create a binding cache entry to record information about the wireless terminal 106. The LMA 192 sends a proxy binding acknowledgement including the HoA to the MAG 190.

The MAG 190 and the LMA 192 establish a tunnel for transfer of packets to and from the wireless terminal 106. The MAG 190 then assigns the HoA to the wireless terminal 106. When the wireless terminal 106 transmits a packet, the MAG 190 sends that packet through the tunnel to the LMA 192. The LMA 192 then forwards the packet with a source address of HoA. When a packet arrives at the LMA 192 with a destination address of HoA, the LMA 192 sends the packet to the MAG 190 through the tunnel. The MAG 190 then forwards the packets to the wireless terminal 106.

Using this architecture, the wireless terminal 106 can be unaware of the mobility services provided by the MAG 190. As expected, the wireless terminal 106 has been assigned a home address in the home network 150. The wireless terminal 106 therefore does not need to be aware that the wireless terminal 106 is actually connected to the visited network 160-1 instead of being directly connected to the home network 150.

Referring now to FIGS. 6-8, exemplary message flow diagrams are presented for various methods of obtaining a layer 3 address (e.g., an IP address). In FIG. 6, an example of dynamic host configuration protocol (DHCP) is shown. DHCP may be used to obtain an IPv4 address or an IPv6 address. DHCP for IPv4 is described in RFC 2131, titled "Dynamic Host Configuration Protocol," the disclosure of which is hereby incorporated by reference in its entirety. DHCP for IPv6 is described in RFC 3315, titled "Dynamic Host Configuration Protocol for IPv6 (DHCPv6)," the disclosure of which is hereby incorporated by reference in its entirety.

After a wireless terminal establishes layer 2 connectivity with an access router, the wireless terminal may broadcast a DHCP request. The access router can then provide the wireless terminal with an address via a DHCP reply. In various implementations, a two-stage process may be performed, where two requests and two replies are sent. The initial request may be a discovery message and the initial reply may be an offer message. A subsequent request indicates an acceptance of the offer of the address and a subsequent reply indicates that the access router acknowledges the request. This subsequent reply may provide additional configuration information, such as domain name server (DNS) addresses.

Referring now to FIG. 7, a timeline depicts exemplary stateless IP address autoconfiguration. Stateless autoconfiguration for IPv6 is described in RFC 2462, titled "IPv6 Stateless Autoconfiguration," the disclosure of which is hereby incorporated by reference in its entirety. After the wireless terminal establishes layer 2 connectivity with an access router, the wireless terminal broadcasts a router solicitation message. The access router can then respond with a router advertisement, which includes an address prefix. The address prefix may be local to the access router's network or may be globally routable.

The wireless terminal configures a full IPv6 address based on the address prefix provided by the access router. For example only, the address prefix may be a 64-bit value, and the wireless terminal creates a 128-bit IPv6 address using the address prefix and a 64-bit value based on an interface identifier of the wireless terminal. For example only, the interface identifier may include a media access control (MAC) address.

The wireless terminal may then verify that the created address is unique, at least within the access router's network. The wireless terminal may determine uniqueness of the created address by broadcasting a neighbor discovery message that includes the created address. If no neighbors respond, the wireless terminal assumes that no other network node is using the created address. Neighbor discovery is described in RFC 2461, titled "Neighbor Discovery for IP version 6 (IPv6)," the disclosure of which is hereby incorporated by reference in its entirety.

Referring now to FIG. 8, an exemplary message diagram depicts a scenario where the wireless terminal attempts to use stateless address autoconfiguration but the access router requires the use of DHCP. After layer 2 connectivity is established, the wireless terminal broadcasts a router solicitation message. The access router responds with a router advertisement message indicating that DHCP is required. For example only, this may be indicated by setting an 'M' flag or an 'O' flag in the router advertisement message. In order to obtain a layer 3 address, the wireless terminal responds by broadcasting a DHCP request. The access router can then assign an address to the wireless terminal and provide that address to the wireless terminal in a DHCP reply.

SUMMARY

An access router includes a wireless network interface, an address assignment module, and an availability module. The wireless network interface establishes a wireless link with a wireless terminal. The address assignment module determines a list of packet data networks for use by the wireless terminal. The availability module determines a mobile internet protocol availability for each packet data network in the list of packet data networks and generates an availability signal based on each mobile internet protocol availability. The address assignment module transmits an address assignment message that includes the availability signal to the wireless terminal.

Each of the mobile internet protocol availabilities has a first state when a respective packet data network in the list of packet data networks is routable from the access router and the access router allows mobile internet protocol between the respective packet data network and the wireless terminal; and each of the mobile internet protocol availabilities has a second state when at least one of the respective packet data network is not routable from the access router and the access router disallows mobile internet protocol between the respective packet data network and the wireless terminal.

The availability signal has a first state when each of the mobile internet protocol availabilities has the first state. The availability signal has a first state when none of the mobile internet protocol availabilities has the first state. The availability signal indicates the mobile internet protocol availability of each packet data network in the list of packet data networks. When at least one of the mobile internet protocol availabilities has the first state, the address assignment module allocates a care-of address to the wireless terminal and includes the care-of address in the address assignment message.

The address assignment module receives an address request message and determines the list of packet data networks based on the address request message. The address assignment module determines the list of packet data networks based on a profile entry corresponding to the wireless terminal. A communications system comprises the access router and the wireless terminal. The wireless terminal receives the address assignment message and disconnects from the access router based on the availability signal. Based on the availability signal, the wireless terminal uses a care-of address from the address assignment message to communicate with one or more packet data networks in the list of packet data networks.

A wireless terminal comprises a wireless network interface that establishes a wireless link with an access router; and an address determination module that receives an address assignment message including an availability signal from the access router and that instructs the wireless network interface to disconnect from the access router based on the availability signal. The availability signal indicates availability of mobile internet protocol connection with at least one packet data network.

The address determination module transmits an address request message indicating a list of desired packet data networks to the access router. The address request message includes a list of access point names, each access point name corresponding to one of the list of desired packet data networks. When the address assignment message includes a care-of address, the address determination module assigns the care-of address to the wireless network interface based on the availability signal.

The wireless terminal further comprises an application module that initiates connectivity with a list of desired packet data networks including the at least one packet data network. The address determination module instructs the wireless network interface to disconnect from the access router when the availability signal indicates that connectivity is not available for any packet data network in the list of desired packet data networks.

The address determination module instructs the wireless network interface to disconnect from the access router when the availability signal indicates that connectivity is available for fewer than all packet data networks in the list of desired packet data networks. The wireless terminal further comprises a mobile internet protocol module that establishes mobile internet protocol connectivity with available desired packet data networks including the at least one packet data network.

A method of operating an access router comprises establishing a wireless link with a wireless terminal; determining a list of packet data networks for use by the wireless terminal; determining a mobile internet protocol availability for each packet data network in the list of packet data networks; generating an availability signal based on each mobile internet protocol availability; and transmitting an address assignment message that includes the availability signal to the wireless terminal.

Each of the mobile internet protocol availabilities has a first state when a respective packet data network in the list of packet data networks is routable from the access router and the access router allows mobile internet protocol between the respective packet data network and the wireless terminal; and each of the mobile internet protocol availabilities has a second state when at least one of the respective packet data network is not routable from the access router and the access router disallows mobile internet protocol between the respective packet data network and the wireless terminal.

The availability signal has a first state when each of the mobile internet protocol availabilities has the first state. The availability signal has a first state when none of the mobile internet protocol availabilities has the first state. The availability signal indicates the mobile internet protocol availability of each packet data network in the list of packet data networks.

The method further comprises when at least one of the mobile internet protocol availabilities has the first state, allocating a care-of address to the wireless terminal and including the care-of address in the address assignment message. The method further comprises receiving an address request message and determining the list of packet data networks based on the address request message. The method further comprises determining the list of packet data networks based on a profile entry corresponding to the wireless terminal.

A method of operating a wireless terminal comprises establishing a wireless link with an access router; receiving an address assignment message including an availability signal from the access router. The availability signal indicates availability of mobile internet protocol connection with at least one packet data network; and selectively disconnecting from the access router based on the availability signal.

The method further comprises transmitting an address request message indicating a list of desired packet data networks to the access router. The address request message includes a list of access point names, each access point name corresponding to one of the list of desired packet data networks. The method further comprises when the address assignment message includes a care-of address, using the care-of address for communication with the at least one packet data network based on the availability signal.

The method further comprises initiating connectivity with a list of desired packet data networks including the at least one packet data network disconnecting from the access router when the availability signal indicates that, for each packet data network in the list of desired packet data networks, connectivity is not available. The method further comprises disconnecting from the access router when the availability signal indicates that connectivity is available for fewer than all packet data networks in the list of desired packet data networks. The method further comprises selectively establishing mobile internet protocol connectivity with the at least one packet data network based on the availability signal.

An access router comprises wireless network interfacing means for establishing a wireless link with a wireless terminal; address assignment means for determining a list of packet data networks for use by the wireless terminal; and availability means for determining a mobile internet protocol availability for each packet data network in the list of packet data networks and for generating an availability signal based on each mobile internet protocol availability. The address assignment means transmits an address assignment message that includes the availability signal to the wireless terminal.

Each of the mobile internet protocol availabilities has a first state when a respective packet data network in the list of packet data networks is routable from the access router and the access router allows mobile internet protocol between the respective packet data network and the wireless terminal; and each of the mobile internet protocol availabilities has a second state when at least one of the respective packet data network is not routable from the access router and the access router disallows mobile internet protocol between the respective packet data network and the wireless terminal. The availability signal has a first state when each of the mobile internet protocol availabilities has the first state. The availability signal has a first state when none of the mobile internet protocol availabilities has the first state.

The availability signal indicates the mobile internet protocol availability of each packet data network in the list of packet data networks. When at least one of the mobile internet protocol availabilities has the first state, the address assignment means allocates a care-of address to the wireless terminal and includes the care-of address in the address assignment message. The address assignment means receives an address request message and determines the list of packet data networks based on the address request message.

The address assignment means determines the list of packet data networks based on a profile entry corresponding to the wireless terminal. A communications system comprises the access router and the wireless terminal. The wireless terminal receives the address assignment message and disconnects from the access router based on the availability signal. Based on the availability signal, the wireless terminal uses a care-of address from the address assignment message to communicate with one or more packet data networks in the list of packet data networks.

A wireless terminal comprises wireless network interfacing means for establishing a wireless link with an access router; and address determination means for receiving an address assignment message including an availability signal from the access router and for instructing the wireless network interfacing means to disconnect from the access router based on the availability signal. The availability signal indicates availability of mobile internet protocol connection with at least one packet data network.

The address determination means transmits an address request message indicating a list of desired packet data networks to the access router. The address request message includes a list of access point names, each access point name corresponding to one of the list of desired packet data networks. When the address assignment message includes a care-of address, the address determination means assigns the care-of address to the wireless network interfacing means based on the availability signal.

The wireless terminal further comprises application means for initiating connectivity with a list of desired packet data networks including the at least one packet data network. The address determination means instructs the wireless network interfacing means to disconnect from the access router when the availability signal indicates that connectivity is not available for any packet data network in the list of desired packet data networks.

The address determination means instructs the wireless network interfacing means to disconnect from the access router when the availability signal indicates that connectivity is available for fewer than all packet data networks in the list of desired packet data networks. The wireless terminal further comprises mobile internet protocol means for establishing mobile internet protocol connectivity with desired packet data networks indicated as available by the availability signal.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 11 is an exemplary message flow diagram for accessing multiple PDNs via client mobile IP (CMIP) according to the principles of the present disclosure;

FIGS. 12A-12D are exemplary extended address configuration messages according to the principles of the present disclosure;

DESCRIPTION

Figure 1:
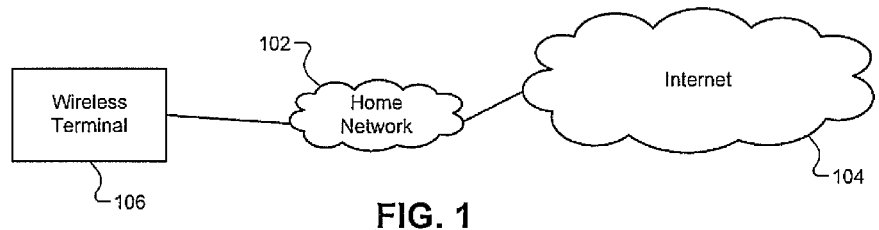
FIG. 1 is a functional block diagram of a wireless communications system according to the prior art.
Figure 2:
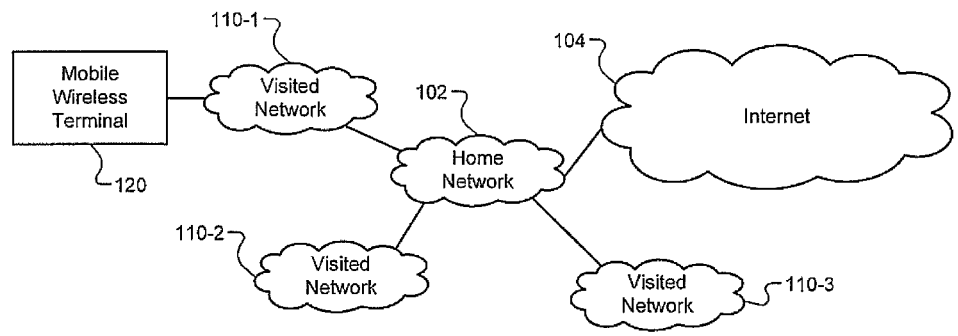
FIG. 2 is a functional block diagram of a wireless communications system offering mobility according to the prior art.
Figure 3:
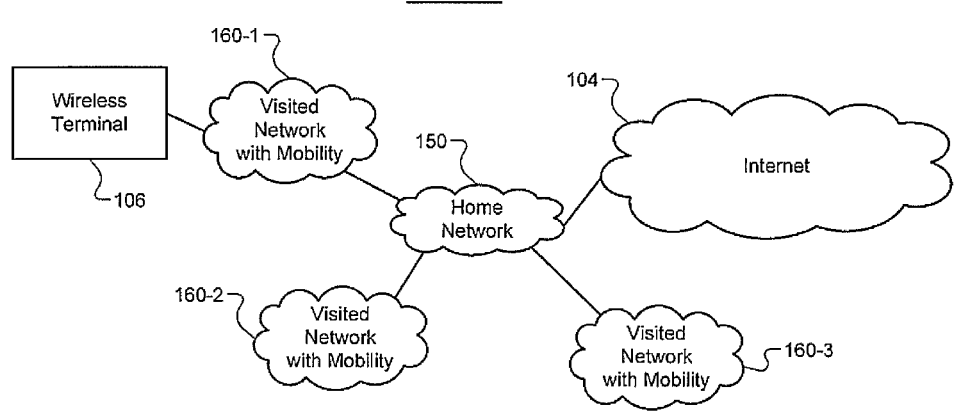
FIG. 3 is a functional block diagram of a wireless communications system according to the prior art that provides proxy mobility to a wireless terminal.
Figure 4:
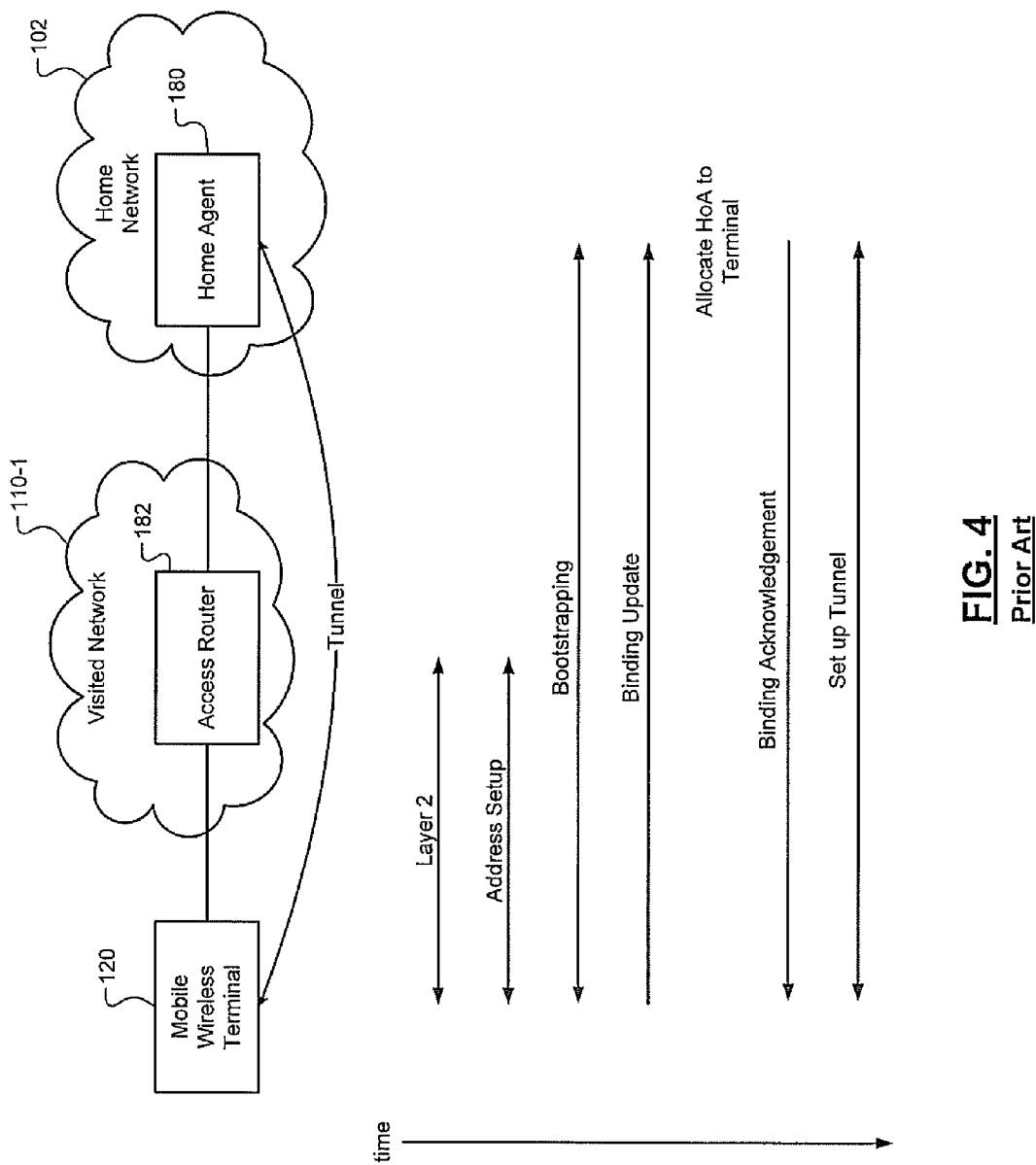
FIG. 4 is a functional block diagram and timeline of an implementation of client mobility according to the prior art.
Figure 5:
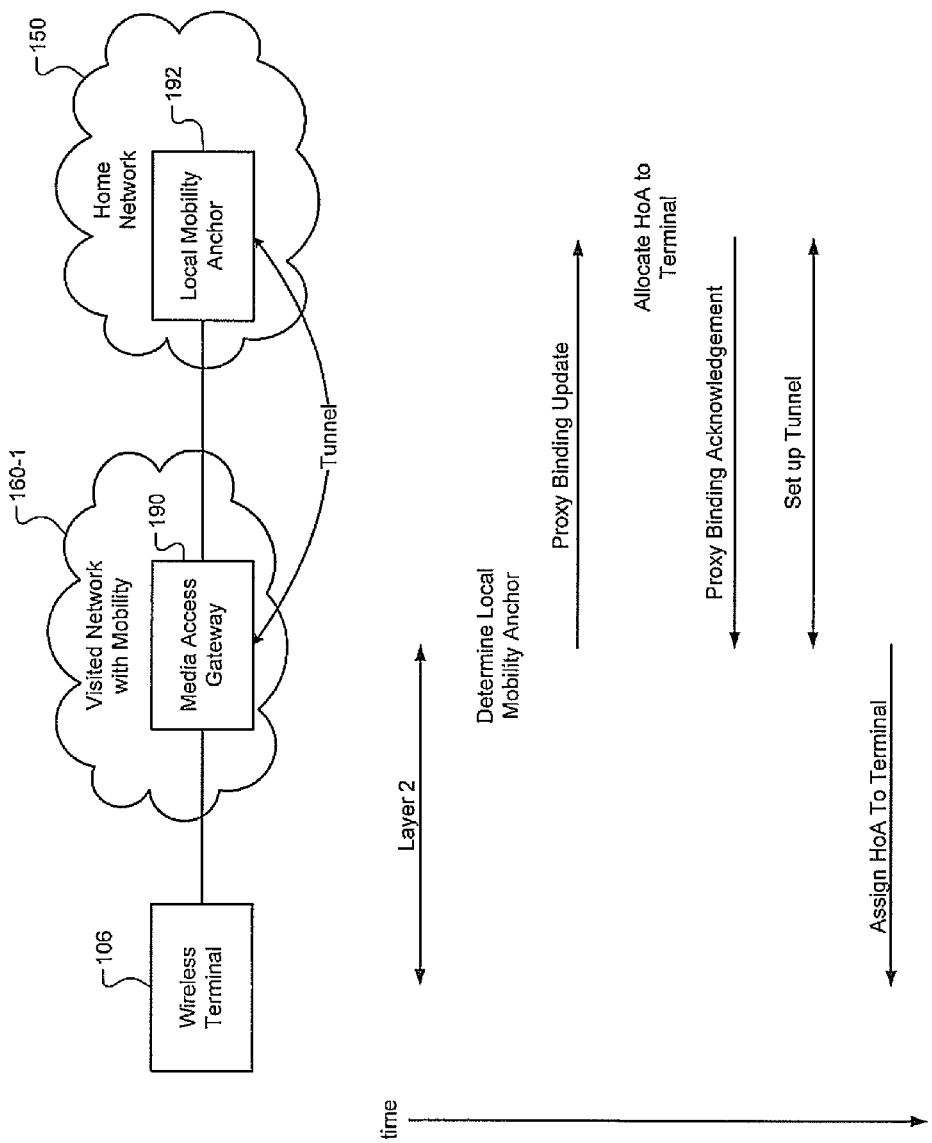
FIG. 5 is a functional block diagram and timeline of an implementation of proxy mobility according to the prior art.
Figure 6:
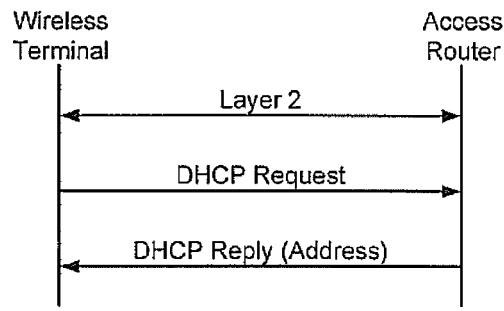
FIGS. 6-8 depict exemplary message flow diagrams for various methods of obtaining a layer 3 address according to the prior art.
Figure 7:
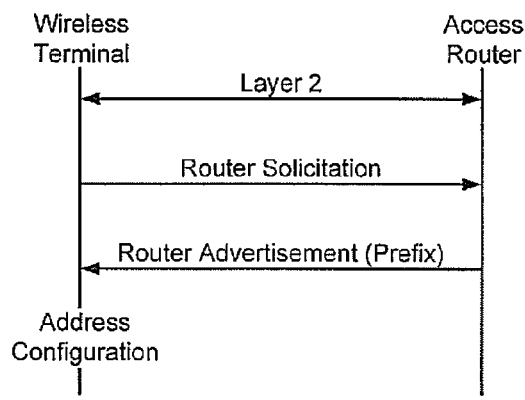
Figure 8:
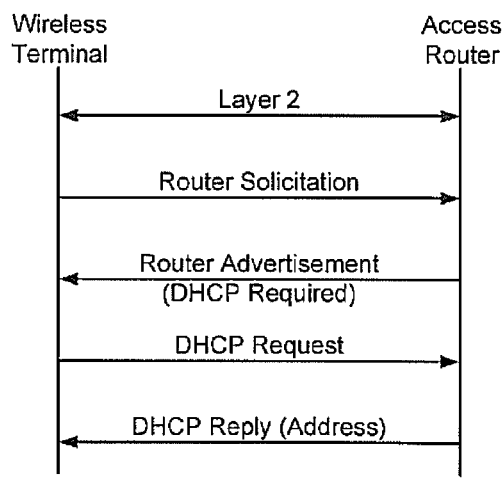

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figures 9, 10:
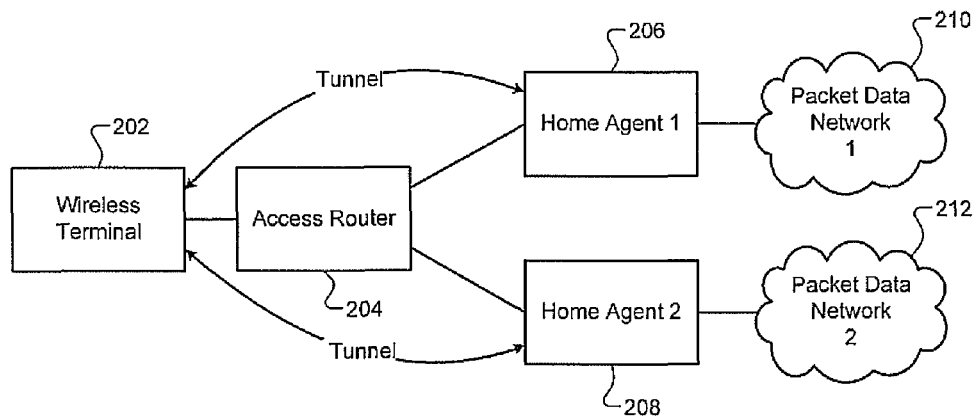
FIG. 9 is a functional block diagram of a wireless terminal using client mobile IP to connect to two home agents according to the principles of the present disclosure.
FIG. 10 is an exemplary table stored by the wireless terminal of FIG. 9 according to the principles of the present disclosure.

Referring now to FIG. 9, a functional block diagram of client-based mobile internet protocol (IP) for accessing two packet data networks (PDNs) via one access router (AR) is presented. A wireless terminal 202 connects to an access router (AR) 204. The AR 204 provides the wireless terminal 202 with a care-of address (CoA). The wireless terminal 202 assigns the CoA to its network interface and can use the CoA to communicate with a first home agent (HA) 206 and a second HA 208. The CoA may refer to a full IP address and/or an IP address prefix from which a full IP address can be determined, such as by stateless IP autoconfiguration.

The wireless terminal 202 may be preprogrammed with the addresses of the first and second HAs 206, 208. Alternatively, the identities of the first and second HAs 206, 208 may be determined from a profile for the wireless terminal 202. This profile may be stored remotely, such as in a home subscriber server (HSS) or an authentication, authorization, and accounting (AAA) server. The wireless terminal 202 may communicate with the first HA 206 in order to use services offered by the first packet data network (PDN) 210. The wireless terminal 202 may communicate with the second HA 208 in order to use services provided by a second PDN 212.

The wireless terminal 202 may retrieve, from storage local to the wireless terminal 202 or from remote storage, the address of an HA that will allow access to a PDN that provides a desired service. For example, if the first PDN 210 provides text messaging functionality, the wireless terminal 202 may retrieve the address of the first HA 206 when the wireless terminal 202 desires to perform text messaging.

The wireless terminal 202 creates tunnels to the first and second HAs 206, 208. Each of the first and second HAs 206, 208 assigns a different home address to the wireless terminal 202—for example only, HoA1 and HoA2. To send a packet to the first PDN 210, the wireless terminal 202 encapsulates the packet and sends the encapsulated packet via the tunnel to the first HA 206. The encapsulated packet has a source address of CoA. The first HA 206 then decapsulates the packet and sends the packet to the PDN 210 with a source address of HoA1.

A node within the first PDN 210 receives the packet and may send a reply packet to HoA1. The reply packet therefore has a destination address of HoA1, which routes to the first HA 206. The first HA 206 retains bindings for attached wireless terminals, and can therefore recognize that HoA1 corresponds to the wireless terminal 202. The first HA 206 therefore encapsulates the reply packet and sends the encapsulated packet to the wireless terminal 202 via the tunnel.

The wireless terminal 202 sends packets to and receives packets from the second PDN 212 similarly. Packets are sent in encapsulated form to the second HA 208 with a source address of CoA, and are then sent out to the second PDN 212 with a source address of HoA2. Packets from the second PDN 212 with a destination of HoA2 are routed to the second HA 208. The second HA 208 passes these packets to the wireless terminal 202 via the tunnel.

Referring now to FIG. 10, an exemplary table stored by the wireless terminal 202 of FIG. 9 is presented. Each service that the wireless terminal 202 desires to use may be identified with a service identifier. The table may include mappings of service identifiers to PDNs, where each PDN is identified by an access point name (APN), which APN may be alphanumeric or purely numeric. In various implementations, a single PDN may provide more than one service.

For purposes of illustration only, when the wireless terminal 202 desires to use service 7 (web browsing), the table may indicate that the PDN identified by $APN_3$ should be used. For purposes of illustration only, FIG. 9 depicts a scenario where two PDNs, the first and second PDNs 210, 212, were identified by the wireless terminal 202. These PDNs may be identified by $APN_1$ and $APN_2$, respectively, and provide push-email/text-messaging and voice over internet protocol (VoIP), respectively.

Referring now to FIG. 11, an exemplary message flow diagram for accessing multiple PDNs via client mobile IP (CMIP) is presented. The wireless terminal establishes layer 2 connectivity with an access router. The access router may access a profile corresponding to the wireless terminal. This profile may be stored in a home subscriber server (HSS) and/or in an authentication, authorization, and accounting (AAA) server.

The wireless terminal and the access router perform address setup. For example only, address setup may include stateless IP auto configuration, where the wireless terminal sends a router solicitation message and the access router responds with a router advertisement message. Alternatively, dynamic host configuration protocol (DHCP) messages may be exchanged.

Once the wireless terminal has established an IP address, the wireless terminal may use that IP address to contact first and second home agents. The wireless terminal performs bootstrapping with the first and second home agents. For example only, bootstrapping may include establishing Internet protocol security (IPSec) internet key exchange (IKE) security associations (SAs). The home agents may also each allocate a home address to the wireless terminal.

The wireless terminal may then transmit a binding update to the first home agent including the assigned address received from the first home agent during bootstrapping. The first home agent may respond with a binding acknowledgement indicating that a binding cache entry has been created for the wireless terminal. Similarly, the wireless terminal may transmit a binding update to the second home agent including the home address allocated by the second home agent. The second home agent responds to the wireless terminal with a binding acknowledgement.

The message flow above assumes that the wireless terminal is able to access the first and second home agents using CMIP. The availability of the first and second PDNs may be based on whether CMIP is both possible and permitted between the wireless terminal and the first and second PDNs via the AR. CMIP may be unachievable and/or disallowed depending on a variety of conditions. For example, one or both of the home agents may not be in contact with the AR. This may be because no routing path is available or because of security and/or service agreements between the access router and the HAs.

Further, the access router may include policy settings that prevent the wireless terminal from communicating with the first and second home agents using CMIP. In addition, the profile for the wireless terminal and/or agreements between the access router and the home network of the wireless terminal may prevent CMIP access to one or both of the HAs. The HAs themselves may disallow CMIP access via the AR for the wireless terminal. For example only, security restrictions may prevent relating to the access router.

If the wireless terminal is not able to access the services provided by the desired PDNs (first and second PDNs in this case), the wireless terminal may decide to locate another access router that will offer this connectivity. However, the wireless terminal may not discover that one or both of the HAs is unavailable until after address setup or bootstrapping.

For example, bootstrapping may succeed with the first HA and fail with the second HA. At this point, the wireless terminal and the access router have expended time before determining that the wireless terminal cannot achieve the connectivity desired. During this time, the access router may be unavailable to other wireless terminals and the wireless terminal is not searching for a more appropriate access router.

Further, the access router may have allocated an IP address or an IP address prefix to the wireless terminal. The successful bootstrapping with the first home agent may also have resulted in the first home agent allocating a home address to the wireless terminal. If the wireless terminal now disconnects from the access router, this time and these resources may be wasted. The resources may not be freed for a predetermined period of time.

Accordingly, the wireless terminal may desire to ascertain the connectivity offered by the access router as soon as possible. The wireless terminal may therefore indicate the PDNs with which the wireless terminal desires to connect before or during address setup with the access router. For example only, the wireless terminal may transmit a list of APNs that identifies the PDNs to which the wireless terminal desires to connect to the access router.

This list may be sent in an address configuration message, and the access router may respond using another address configuration message. By using address configuration messages, the definition of new message types can be avoided. In addition, the address configuration messages may simultaneously be performing address configuration functions, thereby reducing the number of messages sent, and therefore the bandwidth overhead.

In various implementations, address configuration messages are used to configure a layer 3 address when a node, like the wireless terminal, connects to a network. Address configuration messages may include address request messages and address assignment messages. For example only, router solicitation and router advertisement messages may serve as address request and address assignment messages, respectively, when stateless address autoconfiguration is used.

For example only, dynamic host configuration protocol (DHCP) messages may serve as address request and address assignment messages when stateful address configuration. DHCP solicit, discover, and request messages may serve as address request messages. DHCP reply, advertise, acknowledge, and offer messages may serve as address assignment messages.

Referring now to FIGS. 12A-12D, exemplary extended address configuration messages are shown. In FIG. 12A, an extended router solicitation message is shown. The extended router solicitation message includes a list of APNs to which the wireless terminal desires to connect. In FIG. 12B, an extended router advertisement includes a care of address (CoA) prefix for the wireless terminal as well an availability signal (AS).

The availability signal indicates to the wireless terminal whether the requested APNs are available to the wireless terminal. For example only, the availability signal may be a binary signal that indicates whether all PDNs are available, whether no PDNs are available, or whether some PDNs are available. In addition, the availability signal may indicate which PDNs are available if some are not available. In various implementations, the access router may omit the CoA prefix in the extended router advertisement when some or all of the PDNs are not available to the wireless terminal. In this way, if the wireless terminal decides to disconnect based on the lack of availability of a PDN, the access router will not have allocated a prefix for the wireless terminal.

In FIG. 12C, an extended DHCP request is shown. The extended DHCP request may include similar information to the extended router solicitation message. In FIG. 12D, an extended DHCP reply may include similar information to the extended router advertisement. Instead of a CoA prefix, the extended DHCP reply may include a care of address (CoA). As with the extended router advertisement, the extended DHCP reply may omit the CoA if one or more of the PDNs is not available for the wireless terminal.

Figure 13A:
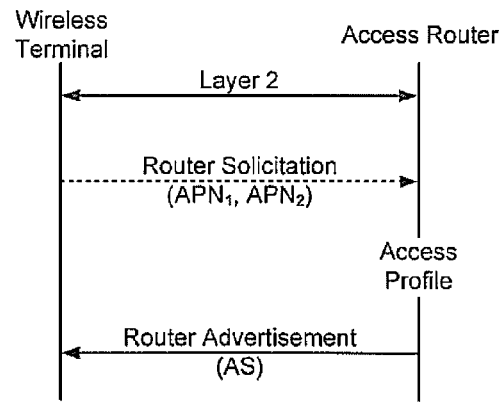
FIGS. 13A-13B are exemplary message flow diagrams of systems implementing an availability signal according to the principles of the present disclosure.
Figure 13B:
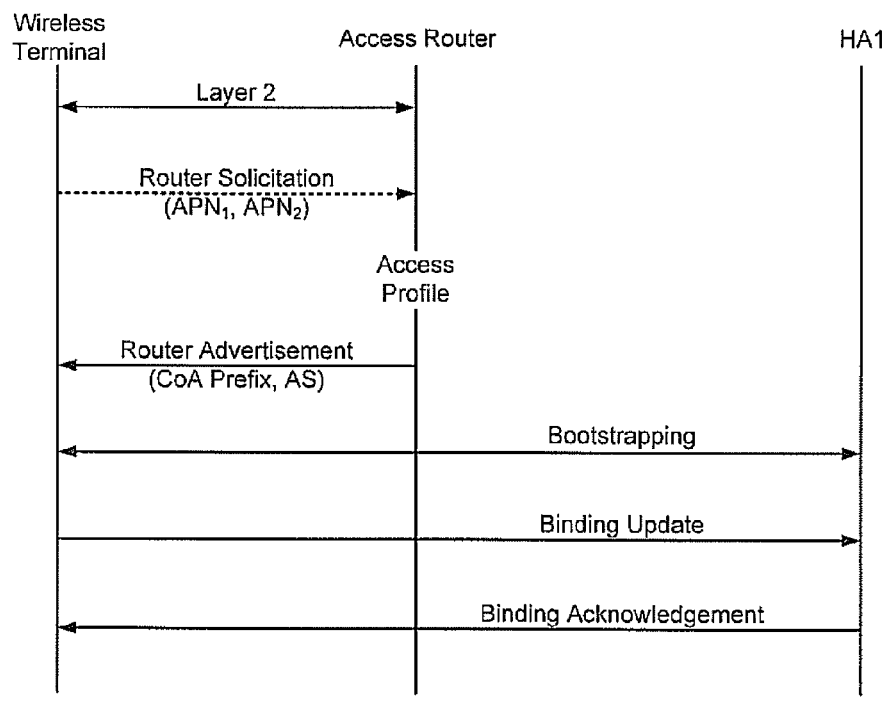

Referring now to FIGS. 13A-13B, exemplary message flow diagrams implementing the availability signal are presented. In FIG. 13A, layer 2 connectivity is established between the wireless terminal and an access router (AR). The wireless terminal may then transmit a router solicitation message to the AR including APNs to which the wireless terminal desires to connect.

The access router may then access a profile corresponding to the wireless terminal and determine whether the desired PDNs are available to the wireless terminal. If the access router does not receive a router solicitation message from the wireless terminal, the access router may determine the desired PDNs based on a default profile or the profile corresponding to the wireless terminal.

For purposes of illustration, in FIG. 13A the access router determines that none of the desired PDNs are available to the wireless terminal. The access router then responds to the wireless terminal with a router advertisement message including an availability signal. The availability signal indicates that no PDNs are available to the wireless terminal. The wireless terminal may then disconnect from the access router and attempt to locate an access router that can provide the desired connectivity.

In FIG. 13B, the wireless terminal establishes layer 2 connectivity with an access router. The wireless terminal may transmit a router solicitation message including a list of desired APNs. After accessing a profile corresponding to the wireless terminal, the access router may determine that the PDN corresponding to $APN_1$ is available to the wireless terminal.

The access router therefore transmits a router advertisement message to the wireless terminal including a care of address (CoA) prefix and an availability signal (AS). The availability signal indicates that some of the PDNs are available. In various implementations, the availability signal may indicate that the PDN corresponding to $APN_1$ is available. The wireless terminal can then perform bootstrapping with a first home agent associated with APN1.

After transmitting a binding update and receiving a binding acknowledgement, the wireless terminal may then communicate with the first PDN via the first home agent. In various implementations, the wireless terminal may desire to disconnect from the access router because one of the PDNs was not available. In addition, if the wireless terminal includes multiple network interfaces, the wireless terminal may use another network interface to attempt to identify an access router that can provide the remaining connectivity.

Figure 14:
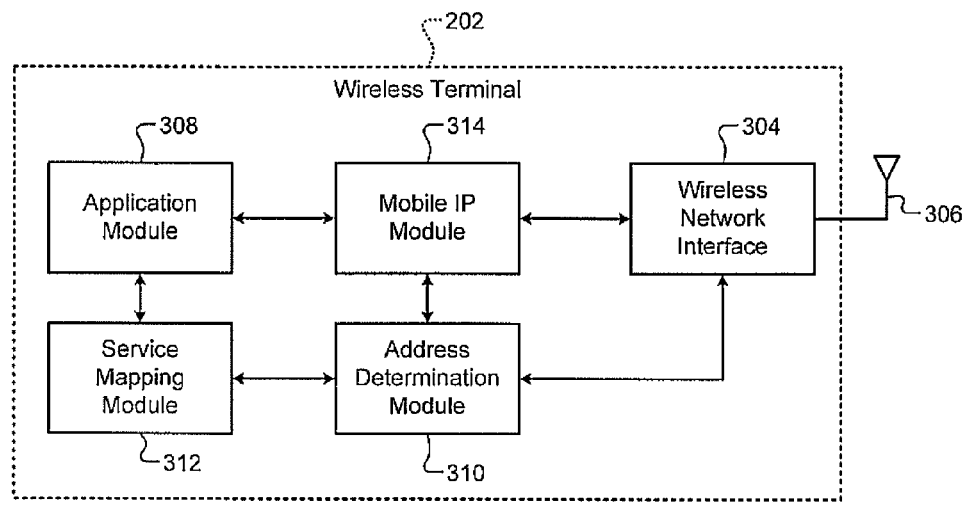
FIG. 14 is a functional block diagram of an exemplary implementation of the wireless terminal of FIG. 9 according to the principles of the present disclosure.

Referring now to FIG. 14, a functional block diagram of an exemplary implementation of the wireless terminal 202 of FIG. 9 is presented. The wireless terminal 202 includes a wireless network interface 304 that transmits and receives wireless signals using an antenna 306. An application module 308 sends and receives data using the wireless network interface 304. The application module 308 may transmit and receive VoIP data, text messaging data, push email data, world wide web data such as hypertext markup language (HTML) data, etc.

An address determination module 310 may transmit and receive address configuration messages via the wireless network interface 304. The address determination module 310 may receive a care of address (CoA) prefix, which the address determination module 310 uses to generate a CoA. In various implementations, the CoA may be received directly in a DHCP reply. The address determination module 310 may assign the CoA to the wireless network interface 304.

The application module 308 may determine desired services, which may be based on applications activated by the user. A service mapping module 312 may map these desired services to PDN identifiers, such as APNs. An exemplary mapping stored by the service mapping module 312 is shown in FIG. 10. APNs corresponding to the desired services are transmitted to the address determination module 310.

The address determination module 310 may include these APNs in an address configuration message sent to the wireless terminal via the wireless network interface 304. The address determination module 310 may receive an availability signal in address configuration messages. Based on the availability signal, the address determination module 310 may instruct the wireless network interface 304 to disconnect from an access router.

The address determination module 310 may indicate to a mobile IP module 314 which PDNs are available for connection. The mobile IP module 314 may process packets to and from the application module 308. For example, as described in detail above with respect to CMIP, the mobile IP module 314 may encapsulate packets from the application module 308. These encapsulated packets are sent via a tunnel to a corresponding home agent. Similarly, tunneled packets from a home agent may be decapsulated by the mobile IP module 314 before being passed to the application module 308. In this way, mobility may be transparent to the application module 308.

The mobile IP module 314 may also perform bootstrapping with available ones of the available PDNs. Further, the mobile IP module 314 may generate binding update messages and process binding acknowledgement messages.

Figure 15:
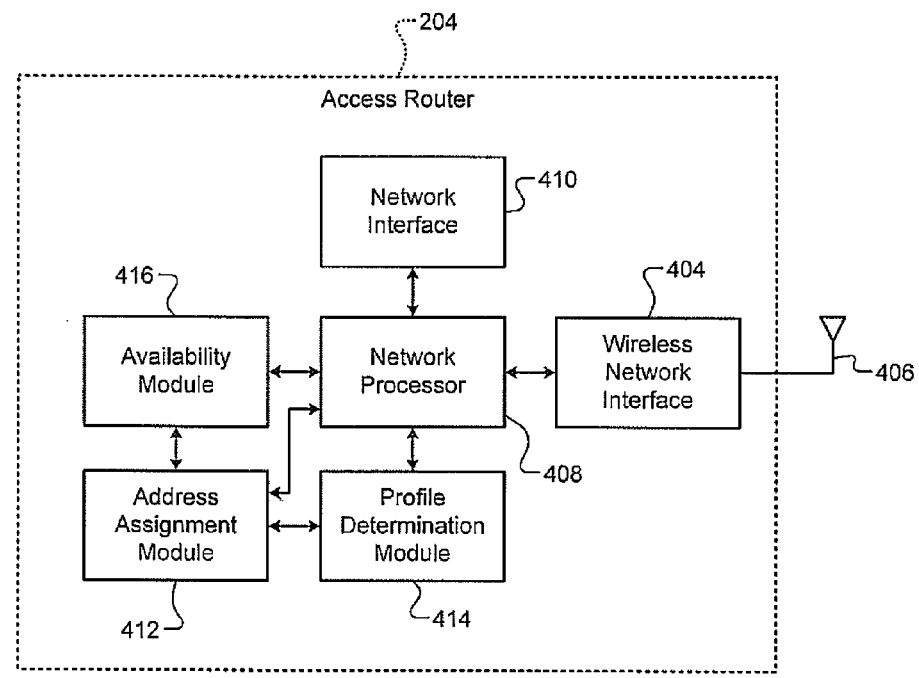
FIG. 15 is a functional block diagram of an exemplary implementation of the access router of FIG. 9 according to the principles of the present disclosure.

Referring now to FIG. 15, a functional block diagram of an exemplary implementation of the access router 204 of FIG. 9 is presented. The access router 204 includes a wireless network interface 404 that transmits and receives wireless signals using an antenna 406. In various implementations, the wireless network interface 404 may support a single access type, such as Wi-Fi (IEEE 802.11) or a third generation partnership project (3GPP) interface.

A network processor 408 routes packets between the wireless network interface 404 and a network interface 410. The network interface 410 may provide connectivity to home agents, and therefore to PDNs. The network interface 410 may include wired and/or wireless connection types. The network processor 408 also routes address configuration messages from the wireless network interface 404 to an address assignment module 412.

The address assignment module 412 may receive a list of desired APNs from the wireless terminal in an address configuration message. A profile determination module 414 may retrieve policy information corresponding to the wireless terminal. The profile determination module 414 may provide a list of default and/or allowed APNs for the wireless terminal to the address assignment module 412.

Based on the profile information and/or information received in address configuration messages, the address assignment module 412 determines a list of desired APNs. An availability module 416 receives this list and determines which of the APNs are available for the wireless terminal. The availability module 416 provides an availability signal (AS) to the address assignment module 412.

The availability signal includes an indication of whether the list of APNs is available to the wireless terminal. In various implementations, the availability signal may be a binary signal indicating whether all of the APNs are available. In various other implementations, the availability signal may be a binary signal indicating whether none of the APNs is available. In addition, the availability signal may include a binary bit field, including an indication corresponding to each of the APNs.

The address assignment module 412 transmits an address configuration message, such as a DHCP reply or a router advertisement, message to the wireless terminal. The address configuration message includes the availability signal and may also include a care of address (CoA) or CoA prefix that the address assignment module 412 assigns to the wireless terminal. The address assignment module 412 may implement and/or communicate with a DHCP server.

The availability module 416 may determine availability of the PDNs based on, for example, local policies and settings and/or service agreements. The availability module 416 may also test connectivity to requested PDNs via the network interface 410.

Figure 16:
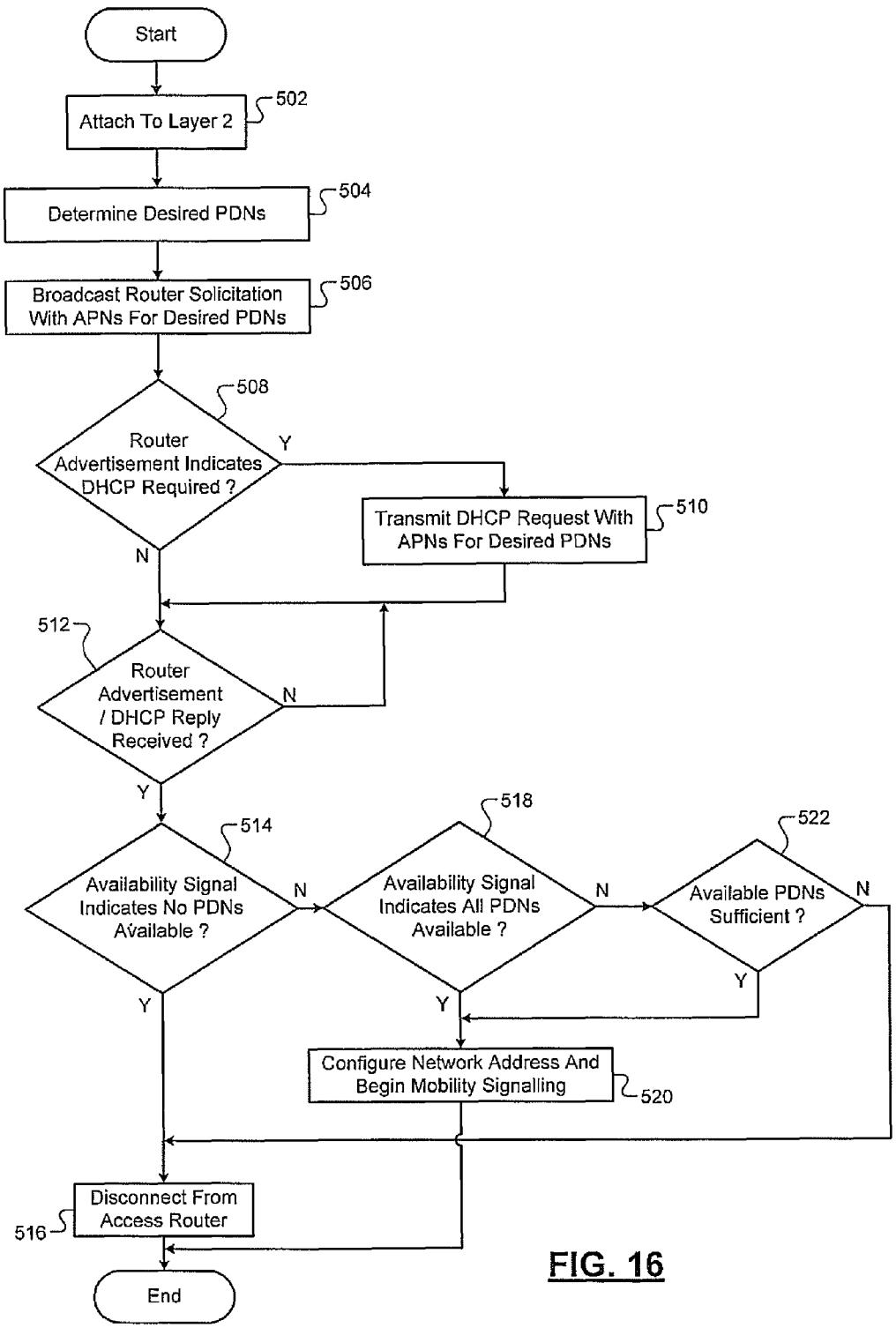
FIG. 16 is a flowchart depicting exemplary operation of the wireless terminal of FIG. 14 according to the principles of the present disclosure.

Referring now to FIG. 16, a flowchart depicts exemplary operation of the wireless terminal 202 of FIG. 14. Control begins in step 502, where the wireless terminal attaches to the access router and establishes layer 2 connectivity. Control continues in step 504, where control determines the desired PDNs for the services desired by the wireless terminal.

Control continues in step 506, where a router solicitation message is broadcast including APNs identifying the desired PDNs. Control continues in step 508, where control determines whether a received router advertisement indicates that DHCP is required. If so, control transfers to step 510; otherwise, control transfers to step 512.

In step 510, control transmits a DHCP request including the APNs corresponding to the desired PDNs. Control then continues in step 512. In step 512, control waits for a router advertisement or DHCP reply to be received. Once this message is received, control transfers to step 514. In step 514, control determines whether an availability signal (AS) in the received message indicates that no PDNs are available. If so, control transfers to step 516; otherwise, control transfers to step 518.

In step 518, control determines whether the availability signal indicates that all PDNs are available. If so, control transfers to step 520; otherwise, control transfers to step 522. In step 522, control determines whether the PDNs that are available are sufficient for the wireless terminal. If so, control transfers to step 520; otherwise, control transfers to step 516. In step 516, the wireless terminal disconnects from the access router and control ends. In step 520, control configures the network address of the wireless terminal based on the received address or prefix and begins mobility signaling with the available PDNs. Control then ends.

Figure 17:
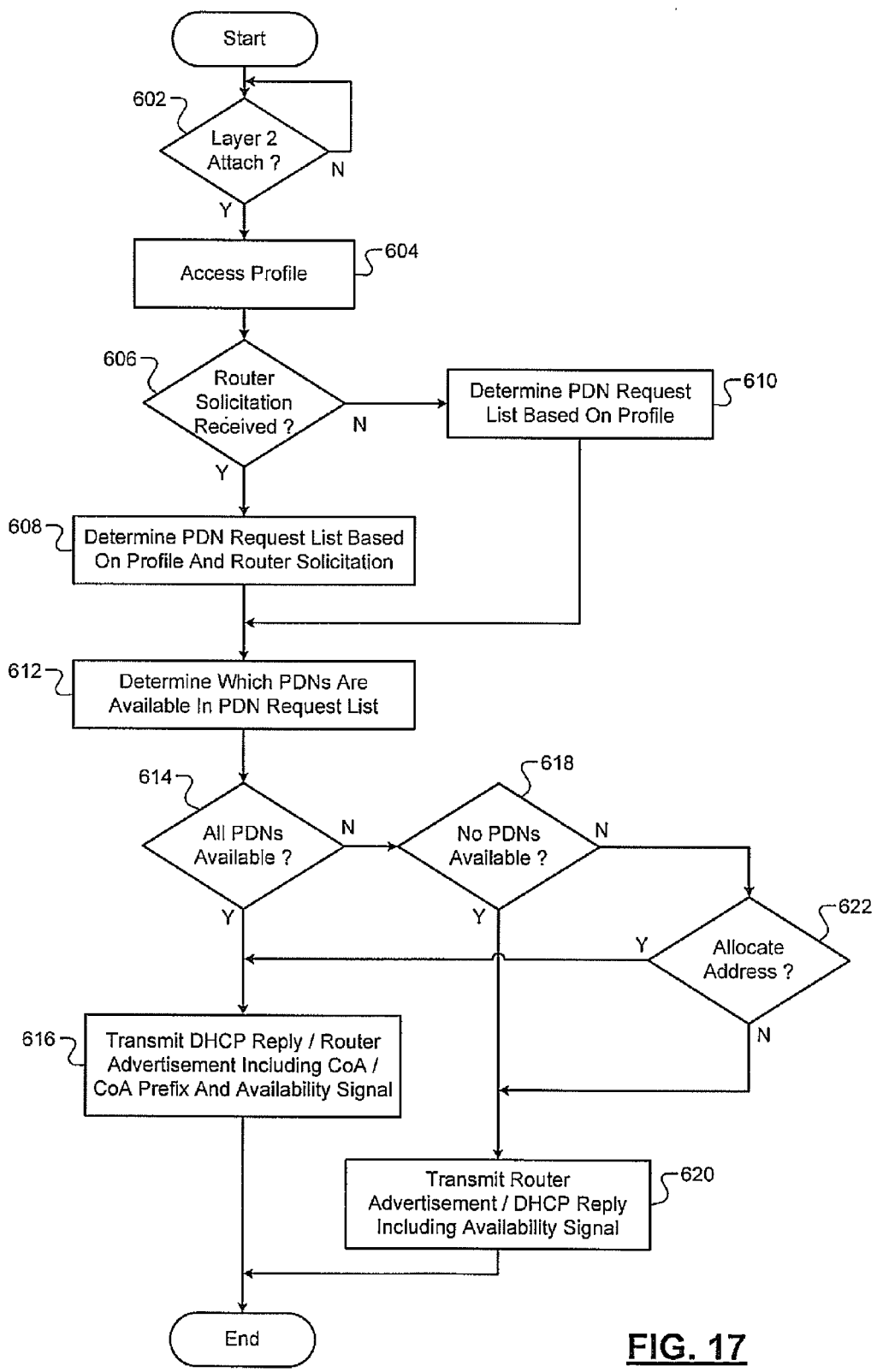
FIG. 17 is a flowchart depicting exemplary operation of the access router of FIG. 15 according to the principles of the present disclosure.

Referring now to FIG. 17, a flowchart depicts exemplary operation of the access router 204 of FIG. 15. Control begins in step 602, where control waits for the wireless terminal to attach to the access router. Once attached, control transfers to step 604, where control accesses the profile corresponding to the wireless terminal.

Control continues in step 606, where control determines whether a router solicitation has been received. If so, control transfers to step 608; otherwise, control transfers to step 610. Control may wait a predetermined period of time for the router solicitation to be received before transferring to step 610.

In step 608, control determines a requested PDN list based on PDN information from the profile and the received router solicitation. Control then continues in step 612. In step 610, control determines the PDN request list based on local information and information stored in the profile. Control then continues in step 612.

In step 612, control determines which of the PDNs in the PDN request list are available. Control then continues in step 614, where control decides whether all of the PDNs are available. If so, control transfers to step 616; otherwise, control transfers to step 618. In step 618, control decides whether none of the PDNs are available. If none of them are available, control transfers to step 620; otherwise, control transfers to step 622.

In step 622, control determines whether to allocate an address or address prefix to the wireless terminal even though fewer than all of the PDNs are available. If control decides to allocate the address or address prefix, control transfers to step 616; otherwise, control transfers to step 620. In step 616, control transmits a DHCP reply or router advertisement including an assigned care of address (CoA) or CoA prefix, respectively. The message also includes an availability signal indicating which of the PDNs is available. Control then ends.

In step 620, control transmits a router advertisement or DHCP reply including an availability signal indicating which of the PDNs are available. Control may omit an allocated address or prefix from this message in order to save address resources in case the wireless terminal decides to disconnect. Control then ends.

Figure 18:
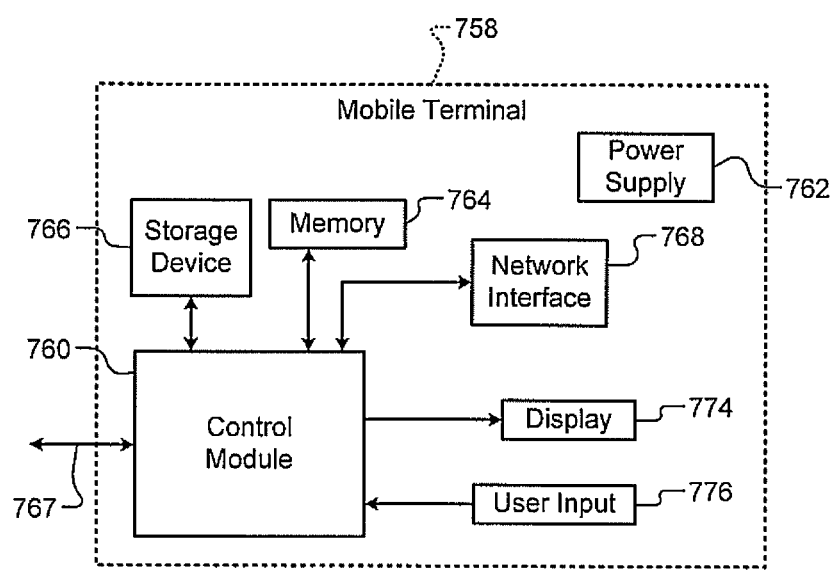
FIG. 18 is a functional block diagram of a mobile terminal according to the principles of the present disclosure.

Referring now to FIG. 18, the teachings of the disclosure can be implemented in a control module 760 of a mobile terminal 758. The mobile terminal 758 includes the control module 760, a power supply 762, memory 764, a storage device 766, and a wireless network interface 767. The mobile terminal 758 may optionally include a network interface 768, a microphone, an audio output such as a speaker and/or output jack, a display 774, and a user input device 776 such as a keypad and/or pointing device. If the network interface 768 includes a wireless local area network interface, an antenna (not shown) may be included.

The control module 760 may receive input signals from the wireless network interface 767, the network interface 768, the microphone, and/or the user input device 776. The control module 760 may process signals, including encoding, decoding, filtering, and/or formatting, and generate output signals. The output signals may be communicated to one or more of memory 764, the storage device 766, the wireless network interface 767, the network interface 768, and the audio output.

Memory 764 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 766 may include an optical storage drive, such as a DVD drive, and/or a hard disk drive (HDD). The power supply 762 provides power to the components of the mobile terminal 758. The teachings of the disclosure can be implemented similarly in other devices such as a personal digital assistant, a media player, a laptop computer, a gaming console, or other mobile computing device.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An access router configured to provide access between a wireless terminal and a plurality of packet data networks, the access router comprising:
   a wireless network interface configured to establish a wireless link with the wireless terminal;
   an address assignment module configured to receive, over the wireless link with the wireless terminal, an address configuration message including a list of desired access point names for use by the wireless terminal, wherein the desired access point names correspond to respective ones of the plurality of packet data networks; and
   an availability module configured to i) determine which ones of the desired access point names included in the address configuration message are available to the wireless terminal, and ii) generate a signal indicating the ones of the desired access point names that are available,
   wherein the address assignment module is further configured to transmit, to the wireless terminal, an address assignment message that includes the signal indicating the ones of the desired access point names that are available to the wireless terminal.

2. The access router of claim 1, wherein the address configuration message includes an address request message or a router solicitation.

3. The access router of claim 1, wherein the address assignment module is configured to, prior to completing address setup with the wireless terminal, receive the address configuration message including the list of desired access point names and transmit the address assignment message that includes the signal indicating which of the desired access point names are available.

4. The access router of claim 1, wherein the address assignment module is configured to receive the address configuration message i) subsequent to establishing layer 2 connectivity with the wireless terminal over the wireless link, and ii) prior to establishing layer 3 connectivity with the wireless terminal.

5. The access router of claim 1, wherein the availability module is configured to determine the ones of the desired access point names that are available to the wireless terminal by accessing a profile corresponding to the wireless terminal.

6. The access router of claim 1, wherein the address assignment message further includes a care of address assigned to the wireless terminal.

7. The access router of claim 1, further comprising a profile determination module configured to provide a list of the ones of the desired access point names that are available to the wireless terminal based on a stored profile corresponding to the wireless terminal.

8. The access router of claim 1, wherein the signal is a binary signal indicating that i) all of the desired access point names are available to the wireless terminal, or ii) none of the desired access point names are available to the wireless terminal.

9. The access router of claim 1, wherein the signal includes a plurality of bits each corresponding to an availability of one of the desired access point names.

10. A method for operating an access router configured to provide access between a wireless terminal and a plurality of packet data networks, the method comprising:
- establishing a wireless link with the wireless terminal;
- receiving, over the wireless link with the wireless terminal, an address configuration message including a list of desired access point names for use by the wireless terminal, wherein the desired access point names correspond to respective ones of the plurality of packet data networks;
- determining which ones of the desired access point names included in the address configuration message are available to the wireless terminal;
- generating a signal indicating the ones of the desired access point names that are available; and
- transmitting, to the wireless terminal, an address assignment message that includes the signal indicating the ones of the desired access point names that are available to the wireless terminal.

11. The method of claim 10, wherein the address configuration message includes an address request message or a router solicitation.

12. The method of claim 10, wherein receiving the address configuration message including the list of desired access point names and transmitting the address assignment message that includes the signal indicating the ones of the desired access point names that are available includes:
- receiving the address configuration message and transmitting the address assignment message prior to completing address setup with the wireless terminal.

13. The method of claim 10, further comprising receiving the address configuration message i) subsequent to establishing layer 2 connectivity with the wireless terminal over the wireless link, and ii) prior to establishing layer 3 connectivity with the wireless terminal.

14. The method of claim 10, further comprising accessing a profile corresponding to the wireless terminal to determine the ones of the desired access point names that are available to the wireless terminal.

15. The method of claim 10, wherein the address assignment message further includes a care of address assigned to the wireless terminal.

16. The method of claim 10, further comprising providing a list of the ones of the desired access point names that are available to the wireless terminal based on a stored profile corresponding to the wireless terminal.

17. The method of claim 10, wherein the signal is a binary signal indicating that i) all of the desired access point names are available to the wireless terminal, or ii) none of the desired access point names are available to the wireless terminal.

18. The method of claim 10, wherein the signal includes a plurality of bits each corresponding to an availability of one of the desired access point names.

* * * * *